(12) United States Patent
Denham

(10) Patent No.: US 7,426,632 B2
(45) Date of Patent: Sep. 16, 2008

(54) CLOCK DISTRIBUTION FOR INTERCONNECT STRUCTURES

(75) Inventor: Martin S. Denham, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 11/095,289

(22) Filed: Mar. 31, 2005

(65) Prior Publication Data

US 2006/0224912 A1   Oct. 5, 2006

(51) Int. Cl.
*G06F 9/00* (2006.01)
*G06F 15/177* (2006.01)

(52) U.S. Cl. ............................. 713/2; 713/1; 713/100; 713/400; 713/500

(58) Field of Classification Search ............ 713/1, 713/2, 100
See application file for complete search history.

(56) References Cited

U.S. PATENT DOCUMENTS 4,866,606 A * 9/1989 Kopetz .................. 713/375

| | | | |
|---|---|---|---|
| 6,377,077 B1 | 4/2002 | Shiraishi | |
| 6,477,659 B1 * | 11/2002 | Ho | ............................. 713/503 |
| 6,963,989 B1 * | 11/2005 | Cullum et al. | ............. 713/401 |
| 2002/0083255 A1 | 6/2002 | Greeff et al. | |
| 2006/0221984 A1 | 10/2006 | Denham | |

FOREIGN PATENT DOCUMENTS

CN   1402140   3/2003

OTHER PUBLICATIONS

"Office Action—Chinese Application No. 200610084165.7", 21 pgs.

\* cited by examiner

*Primary Examiner*—Rehana Perveen
*Assistant Examiner*—Michael J Brown
(74) *Attorney, Agent, or Firm*—Schwegman, Lunbderg & Woessner, P.A.

(57) ABSTRACT

Some embodiments of the invention include an interconnect structure having a plurality of connector circuits to transfer messages among a number of devices. Each of the connector circuits includes a data transfer unit to transfer messages and a clock unit to provide timing to transfer the messages. The interconnect structure propagates a master clock signal serially through the clock units of the connector circuits to generate a number of different input clock signals. The timing provided by each of the clock units is based on the timing of one of the input clock signals. Other embodiments are described and claimed.

28 Claims, 12 Drawing Sheets

US 7,426,632 B2

CLOCK DISTRIBUTION FOR INTERCONNECT STRUCTURES

FIELD

Embodiments of the present invention relate to clock signal distribution in integrated circuit chips.

BACKGROUND

An integrated circuit usually has many devices, each performing a different function. A device transfers data with other devices often based on timing of a main clock signal.

In a typical integrated circuit, a clock generator generates the main clock signal and distributes it to all devices in a parallel fashion such that all devices simultaneously receive a copy of the main clock signal. A clock distribution structure such as a clock tree is usually created to globally distribute the main clock signal throughout the integrated circuit.

Careful design of the clock tree is often necessary to allow accurate distribution of the main clock, to avoid signal interference, and to keep power consumption at an acceptable level.

As integrated circuits become denser and operate at a higher speed, designing an efficient clock tree becomes a challenge.

DESCRIPTION OF EMBODIMENTS

Figure 1:
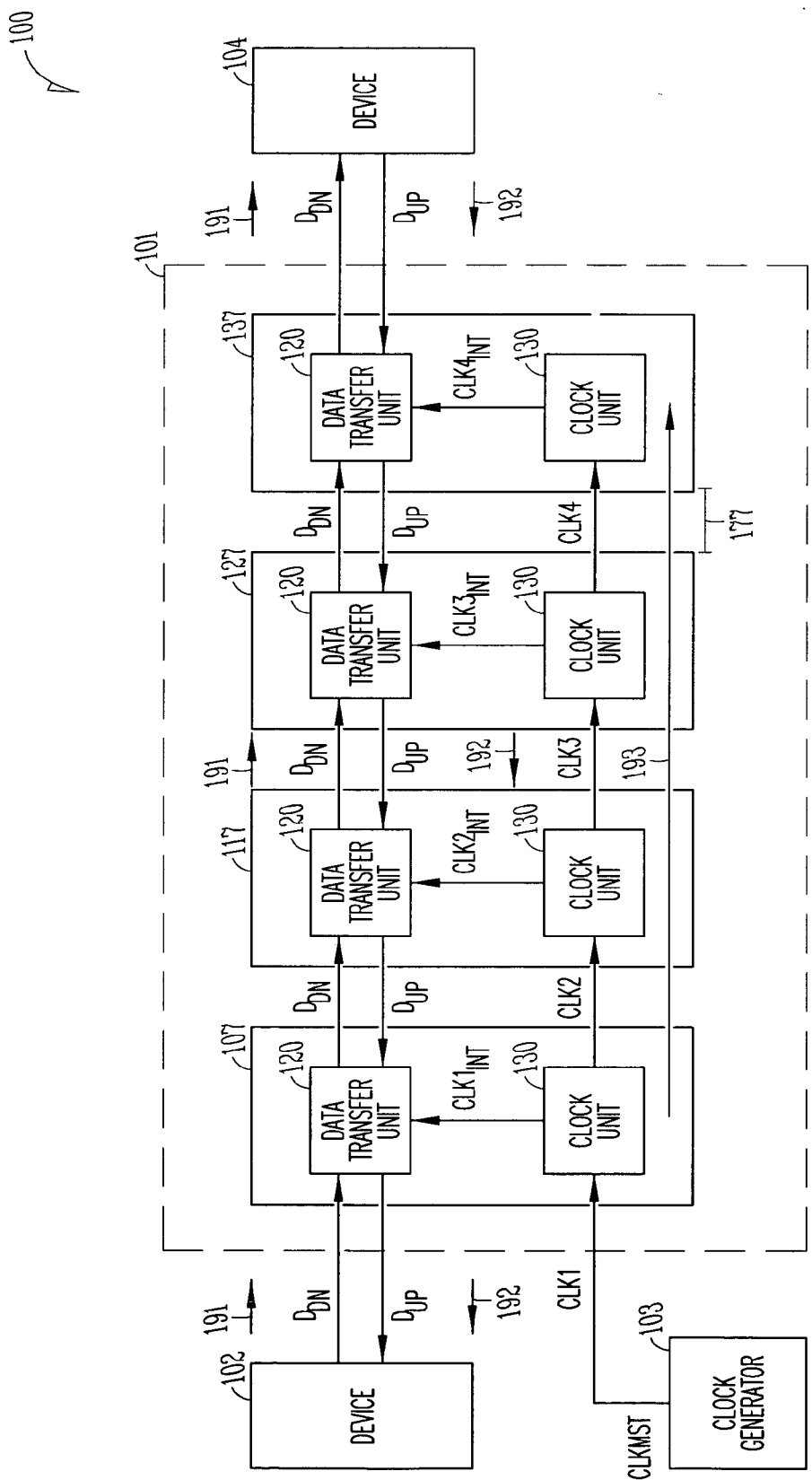
FIG. 1 shows a system having an interconnect structure according to an embodiment of the invention.

The following description and the drawings illustrate some specific embodiments of the invention sufficiently to enable those skilled in the art to practice the embodiments of the invention. Other embodiments may incorporate structural, logical, electrical, process, and other changes. In the drawings, like features or like numerals describe substantially similar components throughout the several views. Examples merely typify possible variations. Portions and features of some embodiments may be included in or substituted for those of others. The scope of various embodiments is determined by the appended claims, along with the full range of equivalents to which such claims are entitled.

FIG. 1 shows a system having an interconnect structure according to an embodiment of the invention. System 100 includes an interconnect structure 101 having a number of connector circuits 107, 117, 127, and 137 coupled in series to form multiple pipelined stages or pipelined interconnection to allow devices 102 and 104 to transfer data with each other. The data includes a downstream message $D_{DN}$ on a downstream transfer path 191 and an upstream message $D_{UP}$ on an upstream transfer path 192.

A clock generator 103 generates a master clock signal CLKMST. As shown in FIG. 1, the CLKMST signal is distributed to connector circuits 107, 117, 127, and 137 in an unparallel fashion. The CLKMST enters one of the connector circuits 107, 117, 127, and 137 and serially propagates through the connector circuits on a clock propagation path 193 to generate a number of different input clock signals CLK1, CLK2, CLK3, and CLK4 signals having different phase relationships with each other. Each of the connector circuits 107, 117, 127, and 137 transfers $D_{DN}$ and $D_{UP}$ based on timing provided by one of the CLK1, CLK2, CLK3, and CLK4 signals.

At least one of the devices 102 and 104 includes an integrated circuit. Examples of devices 102 and 104 include core processing circuits to process data, memory circuits such as cache memory circuits to store data, memory control circuits to control data transferred between system 100 and memory circuits outside system 100. Other examples of devices 102 and 104 include input and output circuits to receive and send data to and from system 100. In some embodiments, the input and output circuits represented by devices 102 and 104 include network connection circuits to allow system 100 to transfer data with other components in a network where system 100 resides. In some embodiments, system 100 is formed on a single integrated circuit chip. In these embodiments, a distance between two consecutive connector circuits (for example, distance 177 in FIG. 1) has a connector distance value. In some embodiments, the connector distance value is less than or equal to two millimeters.

In the embodiment represented by FIG. 1, data includes data information, destination identification (ID) address information, and command information. Data information refers to data being written into or data read from memory locations of a component such as one of the devices 102 and 104. The data information being transferred is associated with a destination ID. The destination ID refers to a physical location of a component such as a physical location of one of the devices 102 and 104. Address information refers to memory locations in a component such as memory locations in the devices 102 and 104. Command information refers to commands associated with a transfer of one or more of the data information, destination ID, and address information. Examples of command information include status information, control information, request information, and transaction type such as read transaction and write transaction.

In the embodiment represented by FIG. 1, a message such as the downstream message $D_{DN}$ or the upstream message $D_{UP}$ includes at least one of the information represented by the data. Thus, a message includes at least one of data information, destination ID, address information, and command information. In some embodiments, each of the data information, destination ID, address information, and command information includes one bit or multiple bits. Thus, in some embodiments, a message includes multiple bits representing at least one of data information, destination ID, address information, and command information. In some embodiments, a bit is represented by a signal having a binary value of binary one or binary zero.

Each of the connector circuits 107, 117, 127, and 137 includes data transfer unit 120 and a clock unit 130. Each clock unit 130 receives one of the CLK1, CLK2, CLK3, and CLK4 signals and generates one of the internal clock signals $CLK1_{INT}$, $CLK2_{INT}$, $CLK3_{INT}$, and $CLK4_{INT}$ to provide timing for one of the data transfer unit 120.

In some embodiments, each data transfer unit 120 includes at least one storage circuit element such as a latch or a flip flop located on each of the downstream transfer path 191 and upstream transfer path 192. In these embodiments, the storage circuit elements in data transfer units 120 independently store and transfer $D_{DN}$ and $D_{UP}$ on downstream transfer path 191 and upstream transfer path 192 based on the timing of the multi-phase clock signals CLK1, CLK2, CLK3, and CLK4.

In some embodiments, each clock unit 130 includes at least one buffer to propagate the CLKMST signal from one clock unit 130 to another clock unit 130 such that the amplitudes and the frequencies of the CLK1, CLK2, CLK3, and CLK4 signals are equal to that of the CLKMST signal. In some embodiments different phases exist among the CLK1, CLK2, CLK3, and CLK4 signals.

Figure 2:
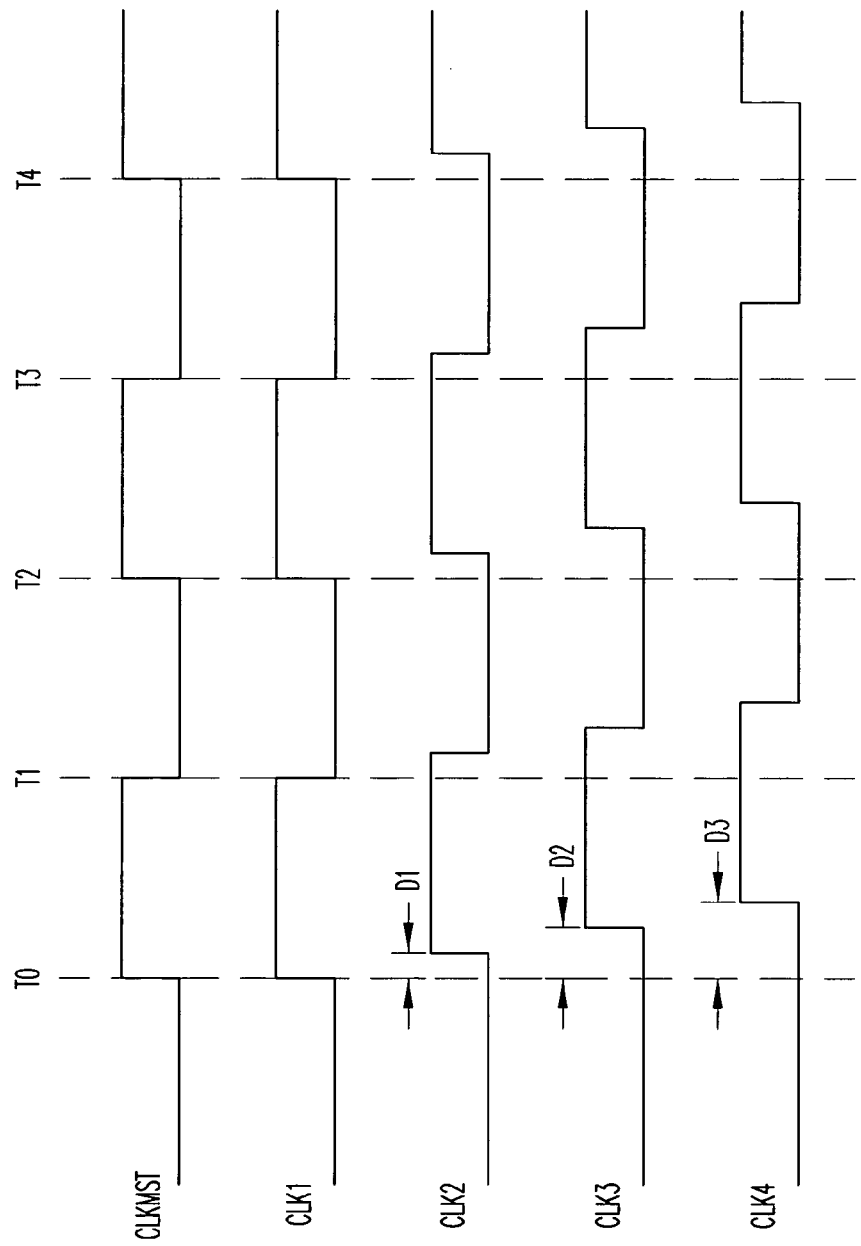
FIG. 2 shows an exemplary timing diagram for clock signals of FIG. 1.

FIG. 2 shows an exemplary timing diagram for clock signals of FIG. 1. In FIG. 2, T0, T1, T2, T3, and T4 represents times. In the exemplary timing diagram of FIG. 2, the CLK1, CLK2, CLK3, and CLK4 signals are not synchronized. The CLK1, CLK2, CLK3, and CLK4 signals are out of phase with each other such that a phase difference exists among any two of the CLK1, CLK2, CLK3, and CLK4 signals. Each of the D1, D2, D3, and D4 represent the phase difference (timing difference) between two clock signals. For example, a phase difference D1 exists between the CLK1 and CLK2 signals; and a phase difference D2 exists between the CLK1 and CLK3 signals.

As shown in FIG. 2, since CLK1, CLK2, CLK3, and CLK4 signals have multiple phase differences, the CLK1, CLK2, CLK3, and CLK4 signals may be called multi-phase clock signals. In FIG. 1, since the multi-phase clock signals CLK1, CLK2, CLK3, and CLK4 propagate on clock propagation path 193, the distribution of the CLK1, CLK2, CLK3, and CLK4 signals on clock propagation path 193 may be called a multi-phase or poly-phase clock distribution. As discussed in FIG. 1, data transfer units 120 of connector circuits 107, 117, 127, and 137 independently transfer $D_{DN}$ and $D_{UP}$ based on the timing of the CLK1, CLK2, CLK3, and CLK4 signals on clock propagation path 193. Since the distribution of the CLK1, CLK2, CLK3, and CLK4 signals is called a poly-phase clock distribution, data transfer units 120 of connector circuits 107, 117, 127, and 137 independently transfer data based on a poly-phase clock distribution. In the poly-phase clock distribution technique of system 100, since the CLK1, CLK2, CLK3, and CLK4 signals with multiple phases are distributed to connector circuits 107, 117, 127, and 137 in a non-synchronized fashion, the clock timing closure for the CLK1, CLK2, CLK3, and CLK4 signals occurs locally, or is self-closing, at connector circuits 107, 117, 127, and 137. Thus, global timing closure in the clock distribution in system 100 may be eliminated, leading to a potential reduction in power.

Further, the out-of-phase relationships among the CLK1, CLK2, CLK3, and CLK4 signals may reduce supply noise and electromagnetic interference (EMI) in interconnect structure of system 100 of FIG. 1.

In some embodiments, the CLKMST, CLK1, CLK2, CLK3, and CLK4 signals have a frequency of at least two gigahertz ($2 \times 10^9$ hertz). In these embodiments, each of the $D_{DN}$ and $D_{UP}$ messages in FIG. 1 is transferred at a rate of at least two gigabits per second ($2 \times 10^9$ bits per second) on a single conductive line in system 100. In some embodiments, each of the $D_{DN}$ and $D_{UP}$ messages is transferred at a rate at least twice the frequency of the CLKMST signal. In some embodiments, multiple data transfers occur at each clock cycle of the CLKMST signal. For example each of the $D_{DN}$ and $D_{UP}$ messages may be transferred at a rate of four gigabits per second ($4 \times 10^9$ bits per second) when the CLKMST signal has a frequency of two gigahertz.

Figure 3:
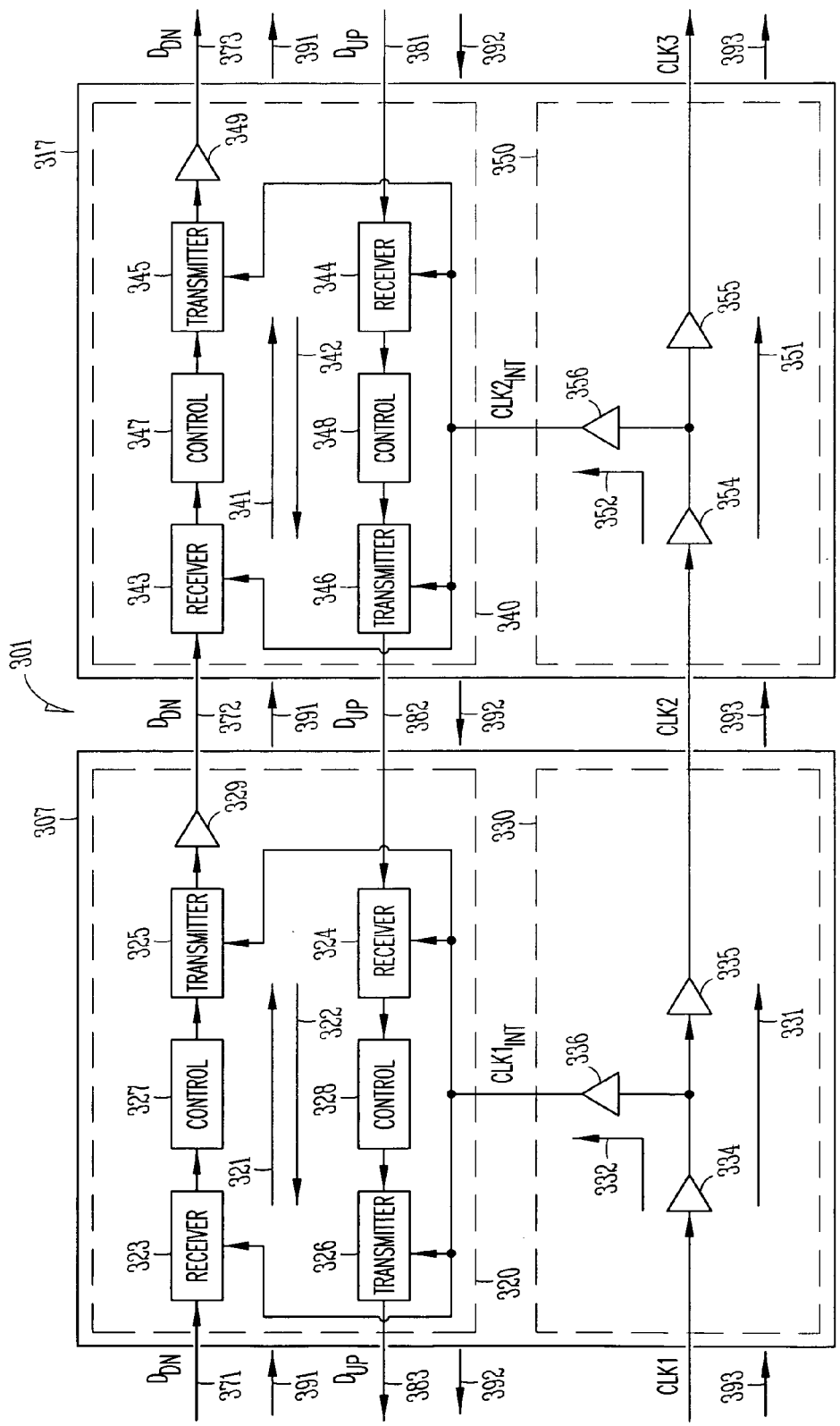
FIG. 3 shows an interconnect structure with connector circuits having a clock distribution in a first configuration according to an embodiment of the invention.

FIG. 3 shows an interconnect structure with connector circuits having a clock distribution in a first configuration according to an embodiment of the invention. Interconnect structure 301 includes connector circuits 307 and 317. In some embodiments, connector circuits 307 and 317 form at least a portion of an interconnect structure such as interconnect structure 101 of FIG. 1. In these embodiments, connector circuits 307 and 317 correspond to two of the connector circuits 107, 117, 127, and 137 of FIG. 1. In other embodiments, multiple copies of one or both of the connector circuits 307 and 317 are connected in series to form an interconnect structure such as interconnect structure 101 of FIG. 1.

In FIG. 3, connector circuits 307 and 317 are connected in series to transfer a downstream message $D_{DN}$ on a downstream transfer path 391 and an upstream message $D_{UP}$ on an upstream transfer path 392. Input clock signals CLK1, CLK2, and CLK3 on a clock propagation path 393 provide timing for the transfer of $D_{DN}$ and $D_{UP}$. In embodiments where connector circuits 307 and 317 form a portion of interconnect structure 101, downstream transfer path 391 corresponds to a portion of downstream transfer path 191 of FIG. 1; upstream transfer path 392 corresponds to a portion of an upstream transfer path 192 of FIG. 1; and clock propagation path 393 is a portion of clock propagation path 193 of FIG. 1.

In FIG. 3, connector circuit 307 includes a data transfer unit 320 and a clock unit 330. Data transfer unit 320 transfers $D_{DN}$ from data node 371 to data node 372 and transfers $D_{UP}$ from data node 382 to data node 383. Clock unit 330 receives an input clock signal CLK1 and generates both an internal clock signal $CLK1_{INT}$ and an input clock signal CLK2. Data transfer unit 320 responses to the $CLK1_{INT}$ signal to transfer $D_{DN}$ and $D_{UP}$.

Data transfer unit 320 includes a downstream data path 321, and upstream data path 322. The combination of the downstream and upstream data paths 321 and 322 forms a bidirectional data path of connector circuit 307 to allow simultaneous transfers of both $D_{DN}$ from data node 371 to data node 372 and $D_{UP}$ from data node 382 to data node 383.

Downstream data path 321 includes a downstream receiver 323 to receive $D_{DN}$ from data node 371, a downstream transmitter 325 to transfer $D_{DN}$ to data node 372, and a control segment 327 to control a transfer of $D_{DN}$ from receiver 323 to transmitter 325. In the embodiment represented by FIG. 3, downstream data path 321 further includes a delay element 329 coupled to an output node of transmitter 325 to provide a time delay to allow $D_{DN}$ to be properly received by connector circuit 317. In some embodiments, the time delay provided by 329 is incorporated into the timing circuit elements of transmitter 325 such that delay element 329 may be omitted.

In some embodiments, receiver 323 includes a latch responsive to the $CLK1_{INT}$ signal to receive and retain the value of $D_{DN}$ provided from data node 371. In other embodiments, receiver 323 includes a flip flop responsive to the $CLK1_{INT}$ signal to receive and retain the value of $D_{DN}$ provided from data node 371. In some other embodiments, receiver 323 includes non-storage circuit elements such that the retention of the value of $D_{DN}$ provided from data node 371 is performed by transmitter 325.

In some embodiments, transmitter 325 includes a latch responsive to the $CLK1_{INT}$ signal to retain the value $D_{DN}$ provided by receiver 323 and to transfer $D_{DN}$ to data node 372. In other embodiments, transmitter 325 includes a flip flop responsive to the $CLK1_{INT}$ signal to retain the value $D_{DN}$ provided by receiver 323 and to transfer $D_{DN}$ to data node 372. In some other embodiments, transmitter 325 includes non-storage circuit elements such that the retention of the value of $D_{DN}$ provided from data node 371 is performed by receiver 323.

In some embodiments, control segment 327 includes circuit elements to perform a logic function, a routing function, or both logic and routing functions.

In the embodiment represented by FIG. 3, the arrangement of the circuit blocks such as receiver 323, control segment 327, and transmitter 325 represents an exemplary arrangement. Those skilled in the art will recognize that other arrangements of the circuit blocks of interconnect structure 301 are possible.

Upstream data path 322 includes an upstream receiver 324 to receive $D_{UP}$ from data node 382, an upstream transmitter 326 to transfer $D_{UP}$ to data node 383, and a control segment 328 to control a transfer of $D_{UP}$ from receiver 324 to transmitter 326. In some embodiments, receiver 324 includes a latch responsive to the $CLK1_{INT}$ signal to receive $D_{UP}$ from data node 382. In other embodiments, receiver 324 includes a flip flop responsive to the $CLK1_{INT}$ signal to receive $D_{UP}$ from data node 382. In some embodiments, transmitter 326 includes a latch responsive to the $CLK1_{INT}$ signal to transfer $D_{UP}$ to data node 383. In other embodiments, transmitter 326 includes a flip flop responsive to the $CLK1_{INT}$ signal to transfer $D_{UP}$ to data node 383. In some embodiments, control segment 328 includes circuit elements to perform a logic function, a routing function, or both logic and routing functions.

Those skilled will recognize that receiver, control, and transmitter functions of the circuit blocks indicated by receivers 323 and 324, control segments 327 and 328, and transmitters 325 and 326 represent functional arrangements of the underlying circuits represented by these circuit blocks. Thus, other equivalent functional arrangements may be represented. For example, the circuit blocks indicated by receivers 323 and 324, control segments 327 and 328, and transmitters 325 and 326 may be combined into fewer circuit blocks to perform functions equivalent to that of receivers 323 and 324, control segments 327 and 328, and transmitters 325 and 326.

Clock unit 330 includes a number of buffers 334, 335, and 336. Clock unit 330 propagates the CLK1 signal through a clock path 331 formed by buffers 334 and 335 to provide the CLK2 signal. Clock unit 330 also propagates the CLK1 signal through a clock path 332 formed by buffers 334 and 336 to provide the $CLK1_{INT}$.

In embodiments where connector circuits 307 and 317 form at least a portion of an interconnect structure such as interconnect structure 101 of FIG. 1, the CLK1 signal of FIG. 3 is provided by a clock generator such as clock generator 103 of FIG. 1. Embodiments exist where connector circuits 307 and 317 form a middle portion of an interconnect structure having multiple pipelined stages such as interconnect structure 101 of FIG. 1. In these embodiments, the CLK1 signal of FIG. 3 is provided by a preceding pipelined stage of the interconnect structure.

Connector circuit 317 includes circuit elements and functions similar to that of connector circuit 307. Connector circuit 317 includes a data transfer unit 340 and a clock unit 350. Data transfer unit 340 transfers $D_{DN}$ from data node 372 to data node 373 and transfers $D_{UP}$ from data node 381 to data node 382. Clock unit 350 receives the CLK2 signal and generates both an internal clock signal $CLK2_{INT}$ and an input clock signal CLK3. Data transfer unit 340 responses to the $CLK2_{INT}$ signal to transfer $D_{DN}$ and $D_{UP}$. In embodiments where connector circuits 307 and 317 form at least a portion of an interconnect structure having multiple pipelined stages such as interconnect structure 101 of FIG. 1, the CLK3 signal is provided to a succeeding pipelined stage of the interconnect structure.

Data transfer unit 340 includes a downstream data path 341, and upstream data path 342. The combination of the downstream and upstream data paths 341 and 342 forms a bi-directional data path of connector circuit 307 to allow simultaneous transfers of both $D_{DN}$ from data node 372 to data node 373 and $D_{UP}$ from data node 381 to data node 382. Downstream data path 341 includes a downstream receiver 343 to receive $D_{DN}$ from data node 372, a downstream transmitter 345 to transfer $D_{DN}$ to data node 373, and a control segment 347 to control a transfer of $D_{DN}$ from receiver 343 to transmitter 345. Upstream data path 342 includes an upstream receiver 344 to receive $D_{UP}$ from data node 381, an upstream transmitter 346 to transfer $D_{UP}$ to data node 382, and a control segment 348 to control a transfer of $D_{UP}$ from receiver 344 to transmitter 346. In some embodiments, each receiver and each transmitter (343, 344, 345, and 346) includes either a latch or a flip flop responsive to the $CLK2_{INT}$ signal to transfer $D_{DN}$ and $D_{UP}$. In some embodiments, each of the control segments 347 and 348 includes circuit elements to perform a logic function, a routing function, or both logic and routing functions.

Similarly to data transfer unit 320 of connector circuit 307, in some embodiments, one of the units of the receiver 343 and transmitter 345 may include non-storage circuit elements such that the retention of the value of $D_{DN}$ provided from data node 372 is performed by the other units. In some embodiments, one of the units of the receiver 344 and transmitter 346 may include non-storage circuit elements such that the retention of the value of $D_{UP}$ provided from data node 381 is performed by the other units. Also similarly to connector circuit 307, those skilled will recognize that receiver, control, and transmitter functions of the circuit blocks indicated by receivers 343 and 344, control segments 347 and 348, and transmitters 345 and 346 represent functional arrangements of the underlying circuits represented by these circuit blocks.

Clock unit 350 of connector circuit 317 includes a number of buffers 354, 355, and 356. Clock unit 350 propagates the CLK2 signal through a first clock path 351 formed by buffers 354 and 355 to provide the CLK3 signal. Clock unit 350 also propagates the CLK2 signal through a second clock path 352 formed by buffers 354 and 356 to provide the $CLK2_{INT}$.

Down stream data path 341 of connector circuit 317 further includes a delay element 349 coupled to an output node of transmitter 345. In embodiments where connector circuits 307 and 317 form at least a portion of an interconnect structure having multiple pipelined stages such as interconnect structure 101 of FIG. 1, delay element 349 allows $D_{DN}$ to be properly received by a succeeding pipelined stage of the interconnect structure. Similarly to delay element 329 in connector circuit 307, in some embodiments, the time delay provided by 349 is incorporated into the timing of circuit elements of transmitter 345 such that delay element 349 may be omitted.

Delay element 349 of connector circuit 317 serves purposes similar to that of delay element 329 of connector circuit 317. As shown in FIG. 2, receiver 343 of connector circuit 317 uses the $CLK2_{INT}$ signal to receive $D_{DN}$, and transmitter 325 of connector circuit 307 uses the $CLK1_{INT}$ signal to send $D_{DN}$ to receiver 343. Since the $CLK1_{INT}$ and $CLK2_{INT}$ signals have different phases, the time delay provided by delay element 329 of connector circuit 307 contributes to preventing a race condition between $D_{DN}$ and $CLK2_{INT}$ from occurring. In some embodiments, the time delay of delay element 329 is set such that the timing relationship between $D_{DN}$ and CLK2 INT satisfies the hold time of receiver 343 of connector circuit 317 during a transfer of $D_{DN}$ from transmitter 325 to receiver 343.

Further, in some embodiments, where connector circuits 307 and 317 is at some specific proximity, each of the connector circuits 307 and 317 may also include a delay element similar to delay element 329 to provide a timing delay at an output node of each of the transmitters 326 and 346 to allow $D_{UP}$ to be properly transferred on upstream transfer path 392.

In embodiments where connector circuits 307 and 317 form at least a portion of an interconnect structure such as interconnect structure 101 of FIG. 1, the length of transmission line or conductive line between connector circuits may be chosen such that at least one or all of delay elements, for example delay elements 329 and 349, in the connector circuits may be omitted. For example, the length of transmission line between connector circuits may be matched to improve data transfer among the connector circuits such that at least one or all of delay elements such as delay elements 329 and 349 in the connector circuits may be omitted.

As shown in FIG. 3, to generate the $CLK1_{INT}$ and $CLK2_{INT}$ signals, the CLK1 signal propagates on two different clock paths having different number of buffers. The first clock path includes buffers 334 and 336; the second clock path includes buffers 334, 335, 354, and 356. Since $CLK1_{INT}$ and $CLK2_{INT}$ signals are generated from propagating the same clock signal CLK1 through a different number of buffers, the $CLK1_{INT}$ and $CLK2_{INT}$ signals have different phases relative to the CLK1 signal. In some embodiments, the $CLK1_{INT}$ and $CLK2_{INT}$ signals are out of phase with each other.

The CLK2 and CLK3 signals also have different phases because the CLK2 and CLK3 signals are generated from the same clock signal (CLK1) propagating through a different number of buffers. The CLK1 signal propagates through buffers 334, 335 to generate the CLK2 signal and propagates through buffers 334, 335, 354, and 355 to generate the CLK3 signal. Thus, in FIG. 3 connector circuit 307 and 317 use clock signals having different phase to transfer data.

In the embodiment represented by FIG. 3, each of the clock units 330 and 350 includes three buffers, as an example. Those skilled will recognize that buffers 334, 335, 336, 354, 355, and 356 are instantiated to compensate for performance loss, signal loss, and signal coupling susceptibility typically associated with integrated circuits, particularly when long signal distances (metal routes) are used. Thus, in some embodiments, some or all of the buffers may be omitted. For example, in some embodiments, the CLK1, CLK2, and CLK3 signals may be allowed to serially propagate on conductive lines in connector circuits 307 and 317, in the direction of clock propagation path 393, unabated and may have allowable phase differences (or phase offsets).

Figure 4:
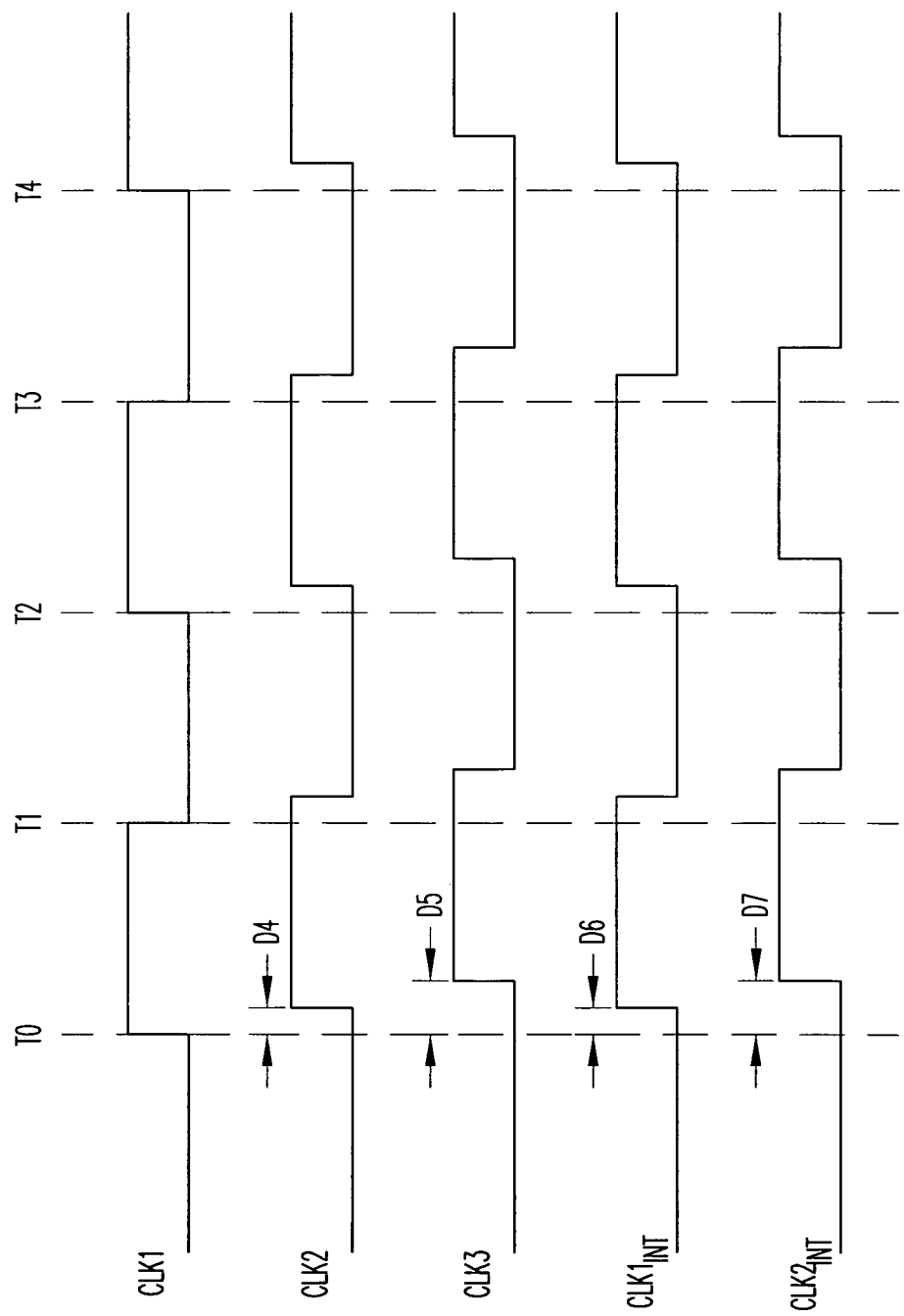
FIG. 4 shows an exemplary timing diagram for clock signals of FIG. 3.

FIG. 4 shows an exemplary timing diagram for clock signals of FIG. 3. As shown in FIG. 4, the CLK1, CLK2, and CLK3 signals are out of phase with each other such that timing differences or phase differences exist among the CLK1, CLK2, and CLK3 signals. D4 and D5 represent the phase differences between the CLK1, CLK2, and CLK3 signals. D6 and D7 represent the phase differences between the $CLK1$, $CLK1_{INT}$, and $CLK2_{INT}$ signals.

Figure 5:
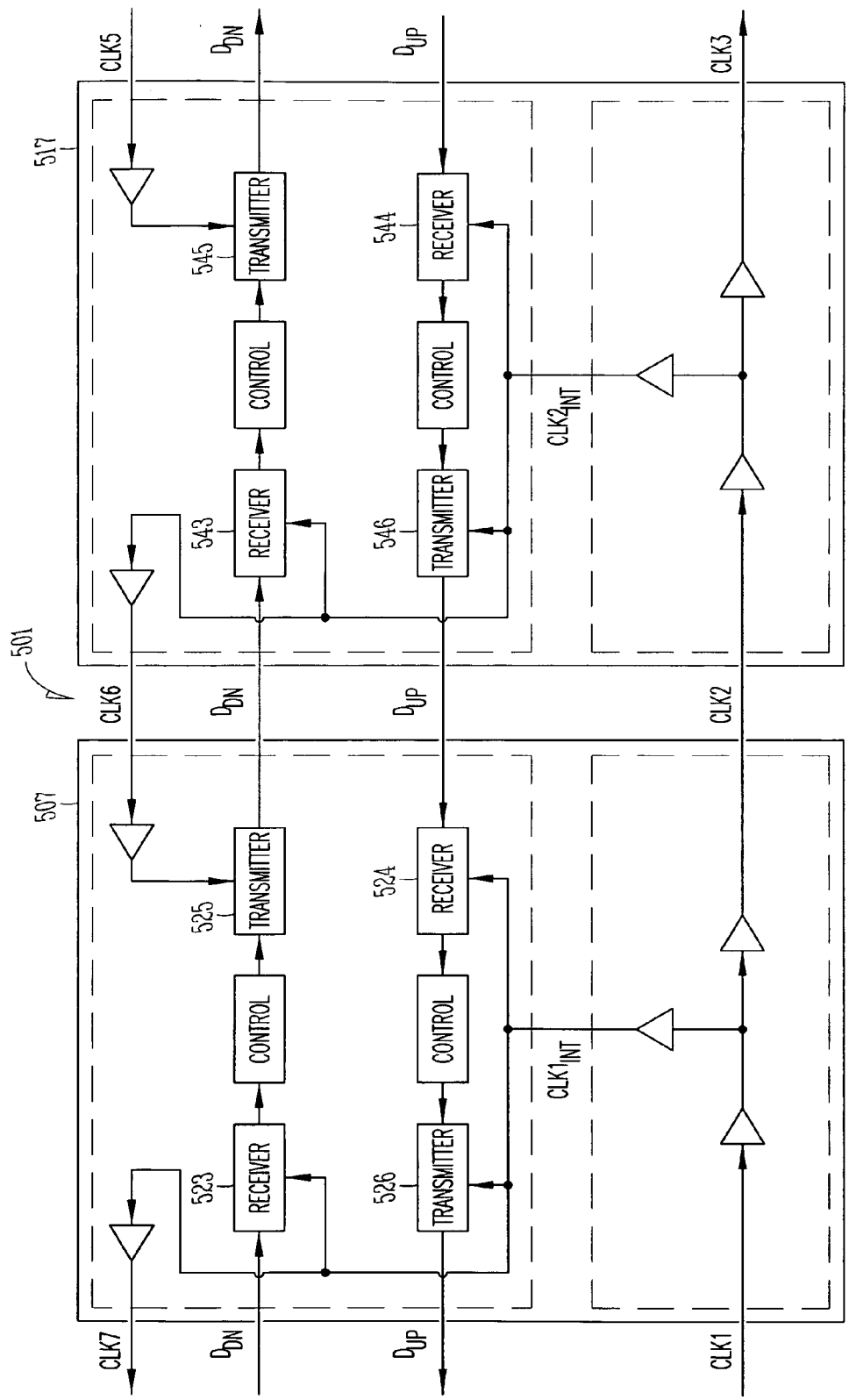
FIG. 5 shows an interconnect structure with connector circuits having a clock distribution in a second configuration according to an embodiment of the invention.

FIG. 5 shows an interconnect structure with connector circuits having a clock distribution in a second configuration according to an embodiment of the invention. Interconnect structure 501 includes connector circuits 507 and 517. In some embodiments, connector circuits 507 and 517 form at least a portion of an interconnect structure such as interconnect structure 101 of FIG. 1. In these embodiments, connector circuits 507 and 517 correspond to two of the connector circuits 107, 117, 127, and 137 of FIG. 1. In other embodiments, multiple copies of one or both of the connector circuits 507 and 517 are connected in series to form an interconnect structure such as interconnect structure 101 of FIG. 1.

Connector circuits 507 and 517 use different clock signals for different combination of the receivers and transmitters within each connector circuit.

In connector circuit 507, receivers 523, 524 and transmitter 526 transfer $D_{DN}$ and $D_{UP}$ using the $CLK1_{INT}$ signal, which is generated from the CLK1 signal, whereas transmitter 525 transfers $D_{DN}$ using a different input clock signal. Transmitter 525 uses an input clock signal CLK6, which is generated by a clock path having the CLK2 signal.

In connector circuit 517, receivers 543, 544 and transmitter 546 transfer $D_{DN}$ and $D_{UP}$ using the $CLK2_{INT}$ signal, which is generated from the CLK2 signal, whereas transmitter 545 transfers $D_{DN}$ using a different input clock signal. Transmitter 545 uses an input clock signal CLK5. In embodiments where connector circuits 507 and 517 form at least a portion of an interconnect structure having multiple pipelined stages such as interconnect structure 101 of FIG. 1, the CLK5 signal is provided by a succeeding pipelined stage similar to connector circuit 507 providing an input clock signal CLK7 to a preceding pipelined stage of the interconnect structure.

Figure 6:
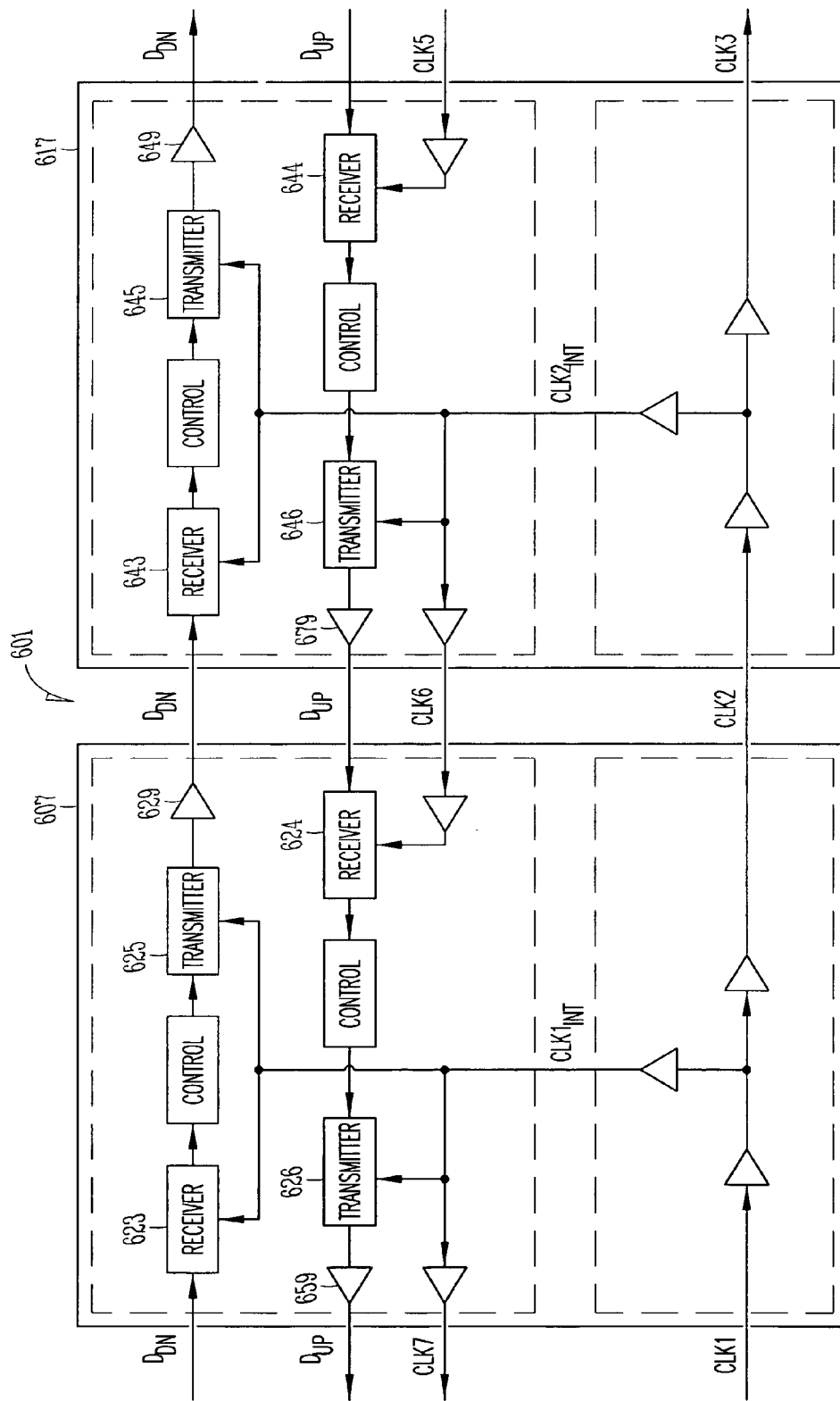
FIG. 6 shows an interconnect structure with connector circuits having a clock distribution in a third configuration according to an embodiment of the invention.

FIG. 6 shows an interconnect structure with connector circuits having a clock distribution in a third configuration according to an embodiment of the invention. Interconnect structure 601 includes connector circuits 607 and 617. In some embodiments, connector circuits 607 and 617 form a portion of an interconnect structure such as interconnect structure 101 of FIG. 1. In these embodiments, connector circuits 607 and 617 correspond to two of the connector circuits 107, 117, 127, and 137 of FIG. 1. In other embodiments, multiple copies of one or both of the connector circuits 607 and 617 are connected in series to form an interconnect structure such as interconnect structure 101 of FIG. 1.

Connector circuits 607 and 617 use different clock signals for different combination of the receivers and transmitters within each connector circuit.

In connector circuit 607, transmitters 625 and 626 and receiver 623 transfer $D_{DN}$ and $D_{UP}$ using the $CLK1_{INT}$ signal, which is generated from the CLK1 signal, whereas receiver 624 transfers $D_{UP}$ using a different input clock signal. Receiver 624 uses an input clock signal CLK6, which is generated by a clock path having the CLK2 signal.

In connector circuit 617, transmitters 645 and 646, and receiver 643 transfer $D_{DN}$ and $D_{UP}$ using the $CLK2_{INT}$ signal, which is generated from the CLK2 signal, whereas receiver 644 transfers $D_{UP}$ using a different input clock signal. Receiver 644 uses an input clock signal CLK5. In embodiments where connector circuits 607 and 617 form at least a portion of an interconnect structure having multiple pipelined stages such as interconnect structure 101 of FIG. 1, the CLK5 signal is provided by a succeeding pipelined stage similar to connector circuit 607 providing the CLK7 signal to a preceding pipelined stage of the interconnect structure.

In FIG. 6, delay elements 629, and 679 allow $D_{DN}$ and $D_{UP}$ to be properly transferred between connector circuits 607 and 617. Delay elements 649 and 659 allow $D_{DN}$ and $D_{UP}$ to be properly transferred between connector circuits 607 and 617 and other pipelined stages of an interconnect structure when connector circuits 607 and 617 are used as a portion of the interconnect structure.

Figure 7:
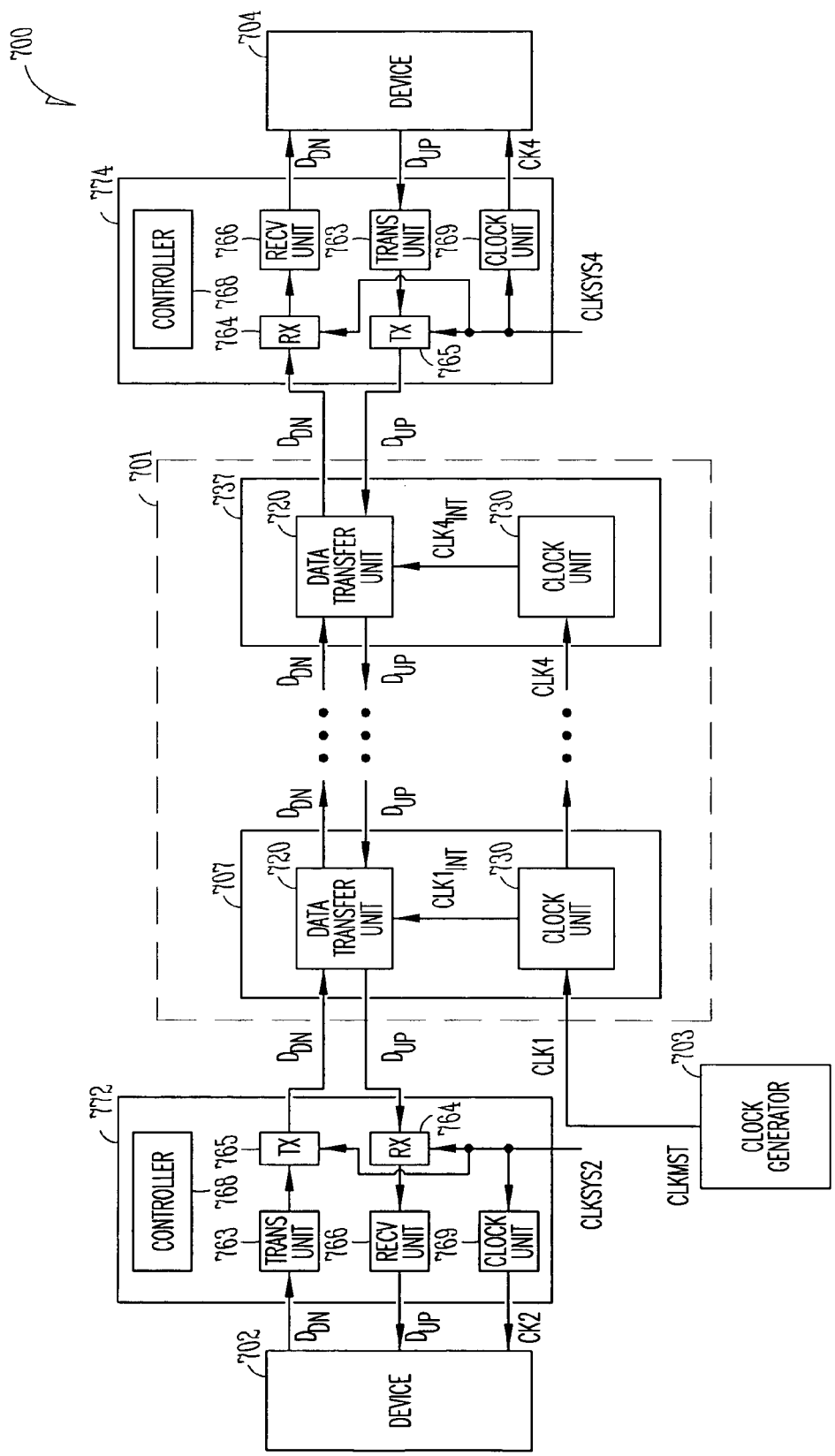
FIG. 7 shows a system having an interconnect structure with connector interface circuits according to an embodiment of the invention.

FIG. 7 shows a system having an interconnect structure with connector interface circuits according to an embodiment of the invention. System 700 includes an interconnect structure 701 having a number of connector circuits 707 and 737 to allow devices 702 and 704 to transfer data with each other. The data transferred between devices 702 and 704 are represented by $D_{DN}$ and $D_{UP}$. Connector circuits 707 and 737 transfer $D_{DN}$ and $D_{UP}$ based on input clock signals CLK1 and CLK4. A clock generator 703 generates a master clock signal CLKMST. The CLK1 and CLK4 signals are generated by a distribution technique at least similar the distribution technique described in FIG. 1 through FIG. 6. For example, the CLK1 and CLK4 signals in FIG. 7 are generated by serially propagating the CLKMST signal though connector circuits 707 and 737.

Interconnect structure 701 also includes a connector interface circuit 772 coupled between device 702 and connector circuit 707 and a connector interface circuit 774 coupled between device 704 and connector circuit 737.

Each of the connector interface circuits 772 and 774 includes a receiver (RX) 764, a receiving unit (RECV) 766, a transmitting unit (TRANS) 763, and a transmitter (TX) 765. In some embodiments, each of the receiver 764 and transmitter 765 includes either a latch or a flip flop responsive to the CLKSYS2 or CLKSYS4 signal to transfer data between connector interface circuits 772 or 774 with interconnect structure 701. In some embodiments, each of the receiving unit 766 and transmitting unit 763 includes a first in first out (FIFO) register. In these embodiments, the FIFO registers in receiving unit 766 and transmitting unit 763 allow connector interface circuits 772 and 774 to adjust to conditions of devices 702 and 704 to improve the transfer of data between each of the devices 702 and 704 and interconnect structure 701. For example, the FIFO registers of receiving unit 766 and transmitting unit 763 may absorb variable wait cycles and variable throughput conditions of devices 702 and 704 to avoid blocking of the transferring of data between each of the devices 702 and 704 and interconnect structure 701.

Each of the connector interface circuits 772 and 774 may further include a controller 768 to control operation within the connector interface circuit and to store information such as statistical information, status information, and communication information associated with conditions of interconnect structure 701.

Each of the connector interface circuits 772 and 774 may further include a clock unit 769 to generate a clock signal. Clock unit 769 of connector interface circuit 772 generates a clock signal CK2 based on a clock signal CLKSYS2. Clock unit 769 of connector interface circuit 774 generates a clock signal CK4 based on a clock signal CLKSYS4. In some embodiments, the CLKSYS2 and CLKSYS4 are provided by clock generator 703. In other embodiments, the CLKSYS2 and CLKSYS4 are provided by a source outside system 700.

In some embodiments, clock unit 769 includes a circuit such as a frequency divider, a frequency multiplier, a phase lock loop (PLL) circuit, or a delay lock loop (DLL) circuit to modify the frequency of the CLKSYS2 and CLKSYS4 signals to allow the CK2 and CLKSYS2 to have different frequencies and to allow the CK4 and CLKSYS4 signals to have different frequencies.

In some embodiments, each of the CK2 and CK4 signals have a frequency different from the frequency of the CLKMST, CLK1, and CLK4 signals such that the devices (702 and 704) and the connector circuits (707 and 737) of interconnect structure 701 transfer data at an unequal transfer rate.

In the embodiment represented by FIG. 7, interconnect structure 701 includes two connector circuits, as an example. In some embodiments, interconnect structure 701 includes a different number of connector circuits. Embodiments of connector circuits 707 and 737 include at least one of the embodiments described in FIG. 1 through FIG. 6.

Figure 8:
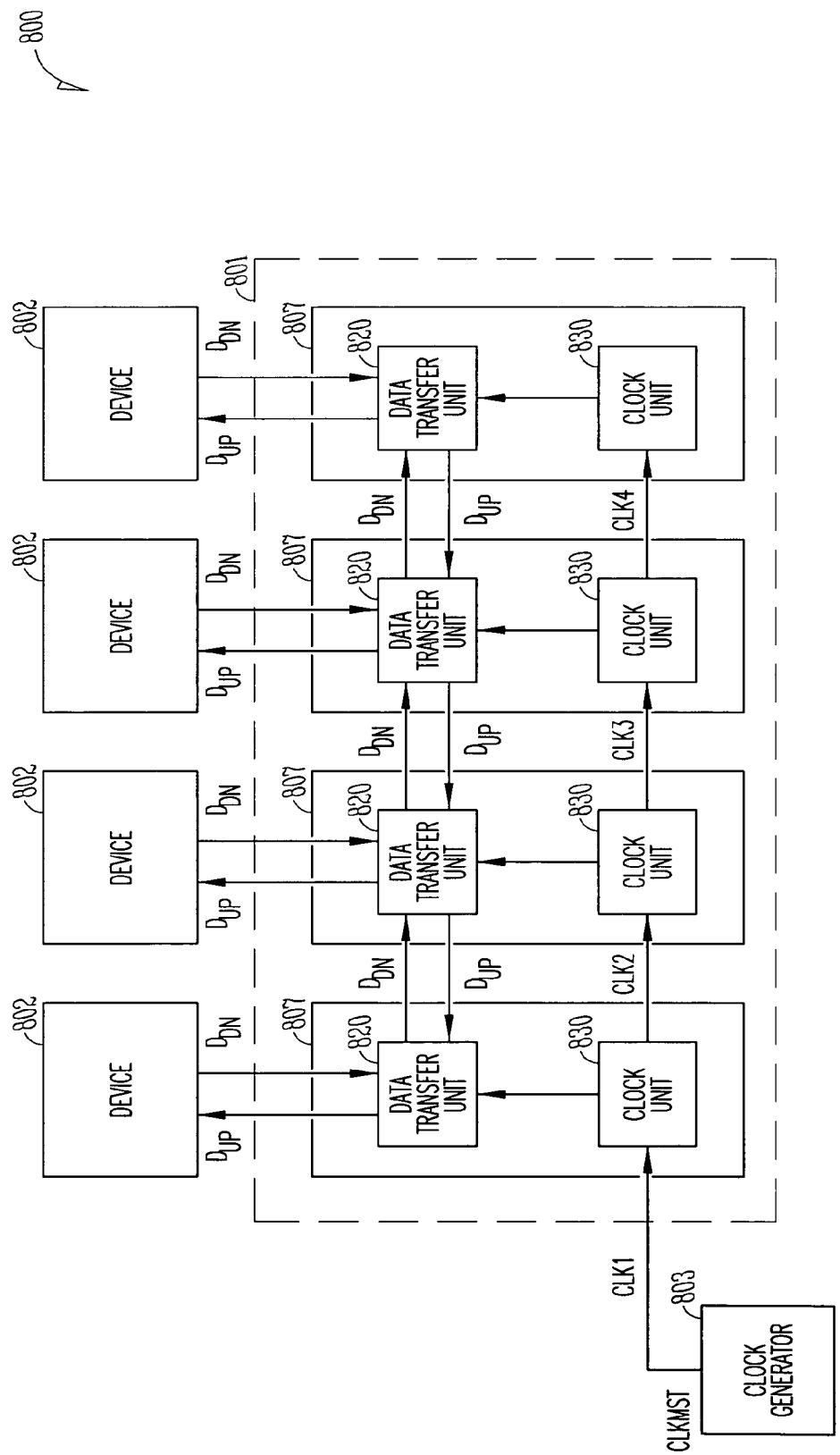
FIG. 8 shows a system having a multi-drop interconnect structure according to an embodiment of the invention.

FIG. 8 shows a system having a multi-drop interconnect structure according to an embodiment of the invention. System 800 includes an interconnect structure 801 having a number of connector circuits 807; the connector circuits form a multi-drop pipelined interconnection to allow devices 802 to transfer data with each other. In FIG. 8, the data is indicated by $D_{DN}$ and $D_{UP}$.

Connector circuits 807 include embodiments of the connector circuits described in FIG. 1 through FIG. 7. Each connector circuit 807 includes a data transfer unit 820 to transfer $D_{DN}$ and $D_{UP}$ and a clock unit 830 to provide timing for the transfer of $D_{DN}$ and $D_{UP}$ based on one of the input clock signals CLK1, CLK2, CLK3, and CLK4. A clock generator 803 generates a master clock signal CLKMST. Interconnect structure 801 uses the CLKMST to generate the CLK1, CLK2, CLK3, and CLK4 signals based on a clock distribution technique such as the poly-phase clock distribution technique described in FIG. 1 through FIG. 7. For example, in FIG. 8, interconnect structure 801 propagates the master clock signal CLKMST serially through clock units 830 to generate a different input signal at each connector circuit 807.

The poly-phase distribution technique in system 800 allows connector circuits 807 and devices 802 to transfer data independently between a connector circuit and a connector circuit or between a connector circuit and a device based on input clock signals having different phases. In FIG. 8, the input clock signal at each connector circuit 807 (one of the CLK1, CLK2, CLK3, and CLK4 signals) may also be used as timing signal for the transfer of data at the interface between a connector circuit 807 and a device 802 in a fashion similar to the input clock signal being used as timing signal to transfer data between two connector circuits such as connector circuits 307 and 317 of FIG. 3. In some embodiments, the input clock signal at each connector circuit 807 may be used to locally generate multiple clock signals at the connector circuit for both the transfer of data at the interface between a connector circuit 807 and a device 802 and the transfer of data between the connector circuits. In some of these embodiments, the multiple connector clock signals generated locally at each connector circuit 807 may be out of phase with each other.

Figure 9:
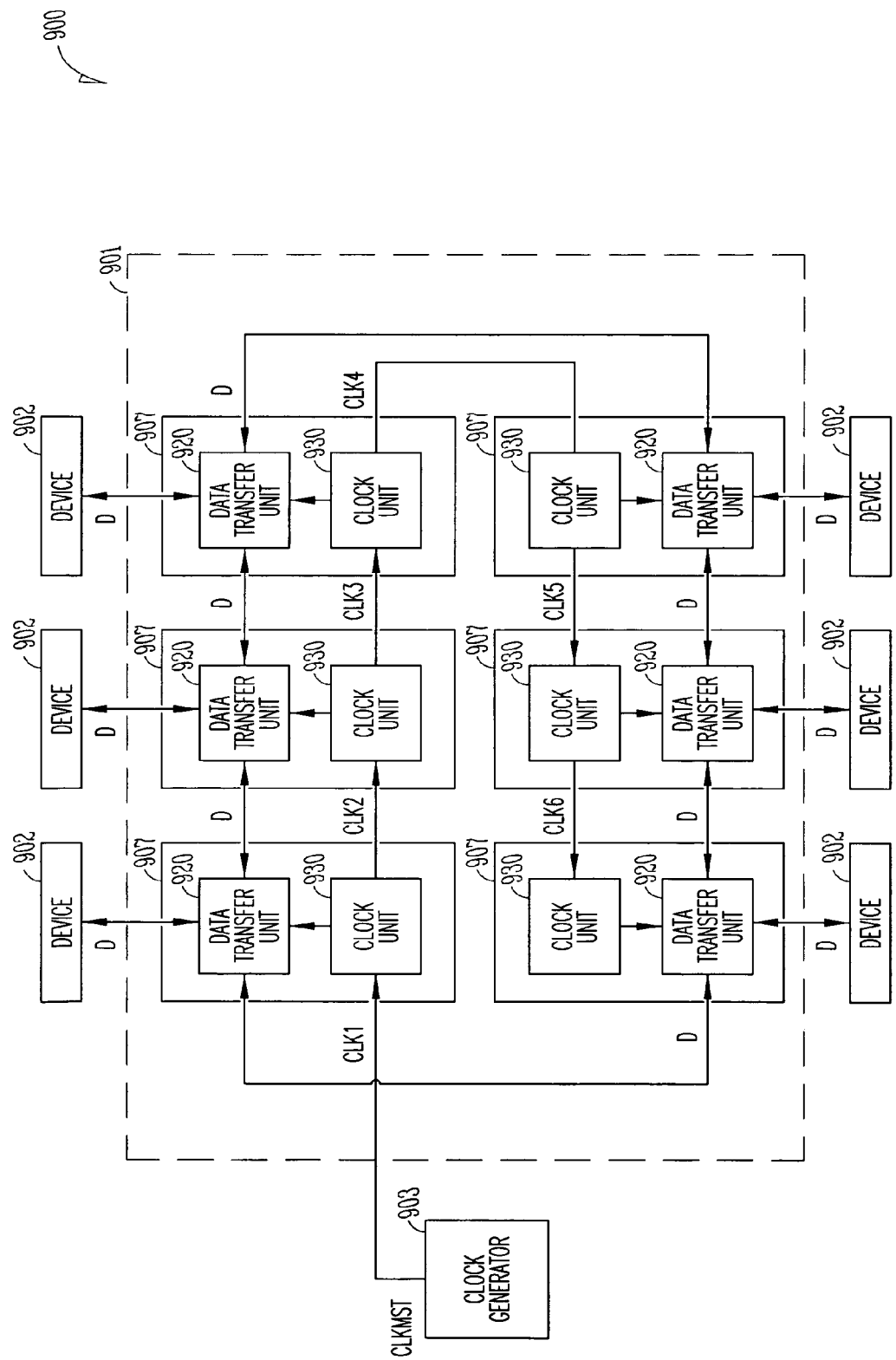
FIG. 9 shows a system having a multi-drop interconnect structure arranged in a ring according to an embodiment of the invention.

FIG. 9 shows a system having a multi-drop interconnect structure arranged in a ring according to an embodiment of the invention. System 900 includes an interconnect structure 901 having a number of connector circuits 907; the connector circuits form multi-drop pipelined interconnection to allow devices 902 to transfer data with each other. In FIG. 9, the data is indicated by label "D" on a bi-directional transfer path. For clarity, the bi-directional transfer path in system 900 of FIG. 9 is shown as a single line.

Connector circuits 907 are arranged in a ring formation to form a ring interconnection or a ringbus. Connector circuits 907 include embodiments of the connector circuits described in FIG. 1 through FIG. 8. Each of the connector circuits 907 includes a data transfer unit 920 to transfer $D_{DN}$ and $D_{UP}$ and a clock unit 930 to provide timing for the transfer of $D_{DN}$ and $D_{UP}$ based on one of the input clock signals CLK1, CLK2, CLK3, CLK4, CLK5, and CLK6 signals. A clock generator 903 generates a master clock signal CLKMST. Interconnect structure 901 uses the CLKMST to generate the CLK1, CLK2, CLK3, CLK4, CLK5, and CLK6 signals based on a clock distribution technique such as the poly-phase clock distribution technique described in FIG. 1 through FIG. 8. For example, interconnect structure 901 receives the CLKMST signal at one of the connector circuits 907 and propagates the CLKMST signal serially through clock units 930 to generate the CLK1, CLK2, CLK3, CLK4, CLK5, and CLK6 signals.

Similarly to system 800 of FIG. 8, the poly-phase distribution technique in system 900 allows connector circuits 907 and devices 902 to transfer data independently between a connector circuit and a connector circuit or between a connector circuit and a device based on input clock signals having different phases. In FIG. 9, the input clock signal at each connector circuit 907 (one of the CLK1, CLK2, CLK3, CLK4, CLK5, and CLK6 signals) may also be used as timing signal for the transfer of data at the interface between a connector circuit 907 and a device 902 in a fashion similar to the input clock signal being used as timing signal to transfer data between two connector circuits such as connector circuits 307 and 317 of FIG. 3. In some embodiments, the input clock signal at each connector circuit 907 may be used to locally generate multiple clock signals at the connector circuit for both the transfer of data at the interface between a connector circuit 907 and a device 902 and the transfer of data between the connector circuits. In some of these embodiments, the multiple connector clock signals generated locally at each connector circuit 907 may be out of phase with each other.

Figure 10:
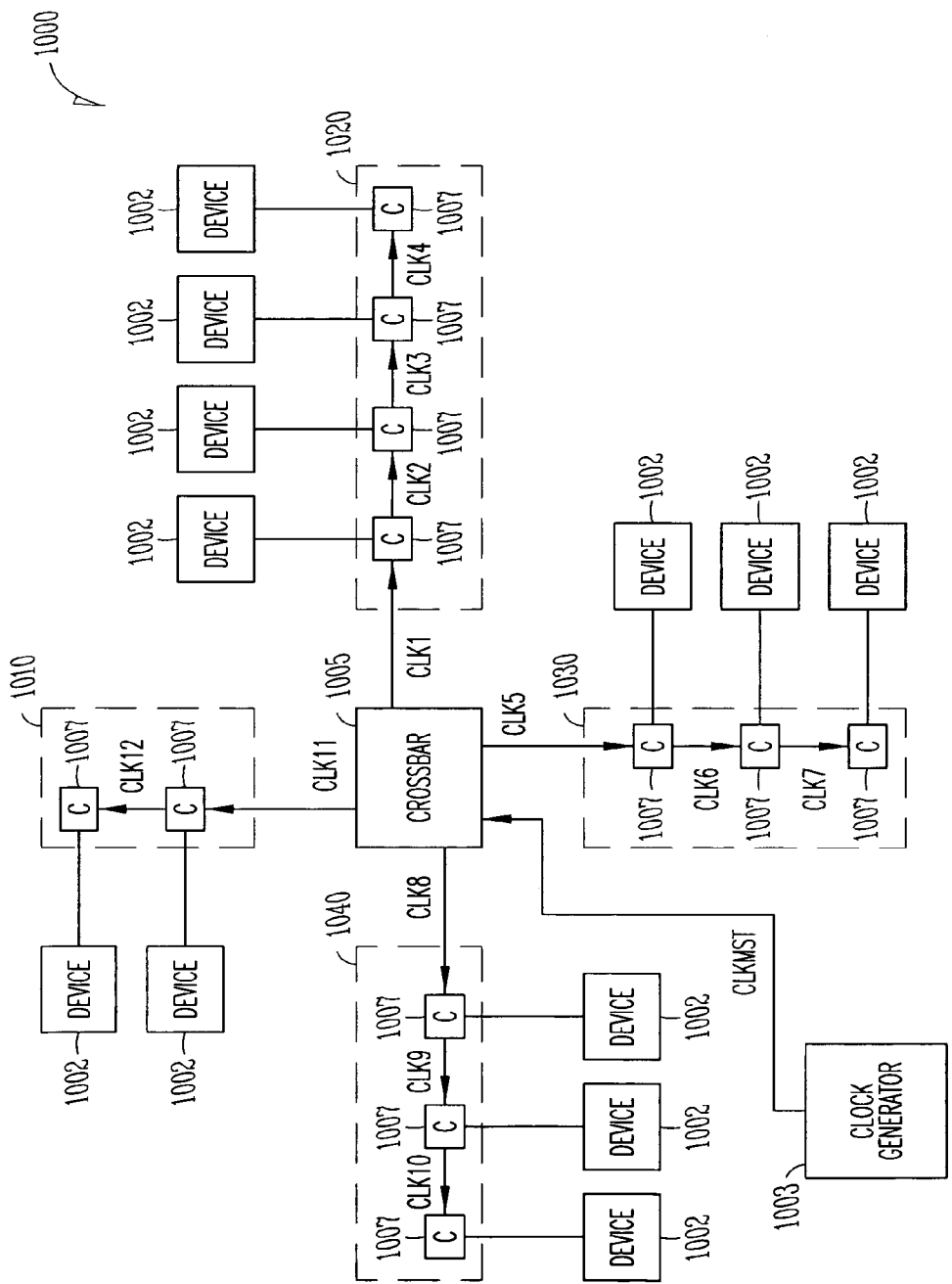
FIG. 10 shows a system having an interconnect structure with a crossbar and multiple interconnect branches according to an embodiment of the invention.

FIG. 10 shows a system having an interconnect structure with a crossbar and multiple interconnect branches according to an embodiment of the invention. In system 1000, the interconnect structure includes a crossbar 1005 and a number of interconnect branches 1010, 1020, 1030, and 1040 to allow a number of devices 1002 to transfer data among each other. For clarity, FIG. 10 omits the label for data and associated transfer lines for the data. As shown in FIG. 10, at least one of the interconnect branches 1010, 1020, 1030, and 1040 forms multi-drop pipelined interconnection such that more than two devices are allowed to transfer data among each other on the multi-drop pipelined interconnection. For example, interconnect branch 1020 forms a multi-drop pipelined interconnection to allow four devices 1002 to transfer data among each other on interconnect branch 1020. The arrangement of crossbar 1005 and interconnect branches 1010, 1020, 1030, and 1040 may be referred to as a fractal or star arrangement or configuration.

Each of the interconnect branches 1010, 1020, 1030, and 1040 includes a group of connector circuits (C) 1007 connected in series to form a multi-drop pipelined interconnection to allow a group of devices 1002 to transfer data with each other. Embodiments of connector circuits 1007 include at least one of the embodiments described in FIG. 1 through FIG. 9.

Crossbar 1005 allows one group of devices 1002 in one interconnect branch to transfer data with another group of devices 1002 in another interconnect branch. Each of the interconnect branches 1010, 1020, 1030, and 1040 generates a different set of input clock signals based on one of the crossbar clock signals CLK1, CLK5, CLK8, and CLK11 provided by crossbar 1005.

In FIG. 10, a clock generator 1003 generates a master clock signal CLKMST. Crossbar receives the CLKMST signal and provides the crossbar clock signals CLK1, CLK5, CLK8, and CLK11. In some embodiments, each of the CLK1, CLK5, CLK8, and CLK11 signals is a copy of the CLKMST signal.

Each of the interconnect branches 1010, 1020, 1030, and 1040 uses one of the CLK1, CLK5, CLK8, and CLK11 signals to generate the input clock signals within the interconnect branch. In some embodiments, each of the interconnect branches 1010, 1020, 1030, and 1040 uses a clock distribution technique such as the poly-phase clock distribution technique described in FIG. 1 through FIG. 9 to generate the set of input clock signals in the interconnect branch.

For example, interconnect branch 1020 propagates the CLK1 serially through connector circuits 1007 within interconnect branch 1020 to generate input clock signals CLK2, CLK3, and CLK4. Interconnect branch 1030 propagates the CLK5 signal serially through connector circuits 1007 of interconnect branch 1030 to generate input clock signals CLK6 and CLK7. Interconnect branch 1040 propagates the CLK8 signal serially through connector circuits 1007 of interconnect branch 1040 to generate input clock signals CLK9 and CLK10 signals. Interconnect branch 1010 propagates the CLK11 signal serially through connector circuits 1007 of interconnect branch 1010 to generate input clock signal CLK12.

The poly-phase distribution technique in system 1000 allows connector circuits 1007, devices 1002, and crossbar 1005 to transfer data independently among each other based on input clock signals having different phases. In FIG. 10, the input clock signal at each connector circuit 1007 of each of the interconnect branches 1010, 1020, 1030, and 1040 may also be used as timing signal for the transfer of data at the interface between a connector circuit 1007 and a device 1002, or between a connector circuit 1007 and crossbar 1005 in a fashion similar to the input clock signal being used as timing signal to transfer data between two connector circuits such as connector circuits 307 and 317 of FIG. 3. In some embodiments, the input clock signal at each connector circuit 1007 of each of the interconnect branches 1010, 1020, 1030, and 1040 may be used to locally generate multiple clock signals at the connector circuit for the transfer of data at the interface between a connector circuit 1007 and a device 1002, the transfer of data between the connector circuits, and the transfer of data between the connector circuit and crossbar 1005. In some of these embodiments, the multiple connector clock signals generated locally at each connector circuit 1007 may be out of phase with each other.

Figure 11:
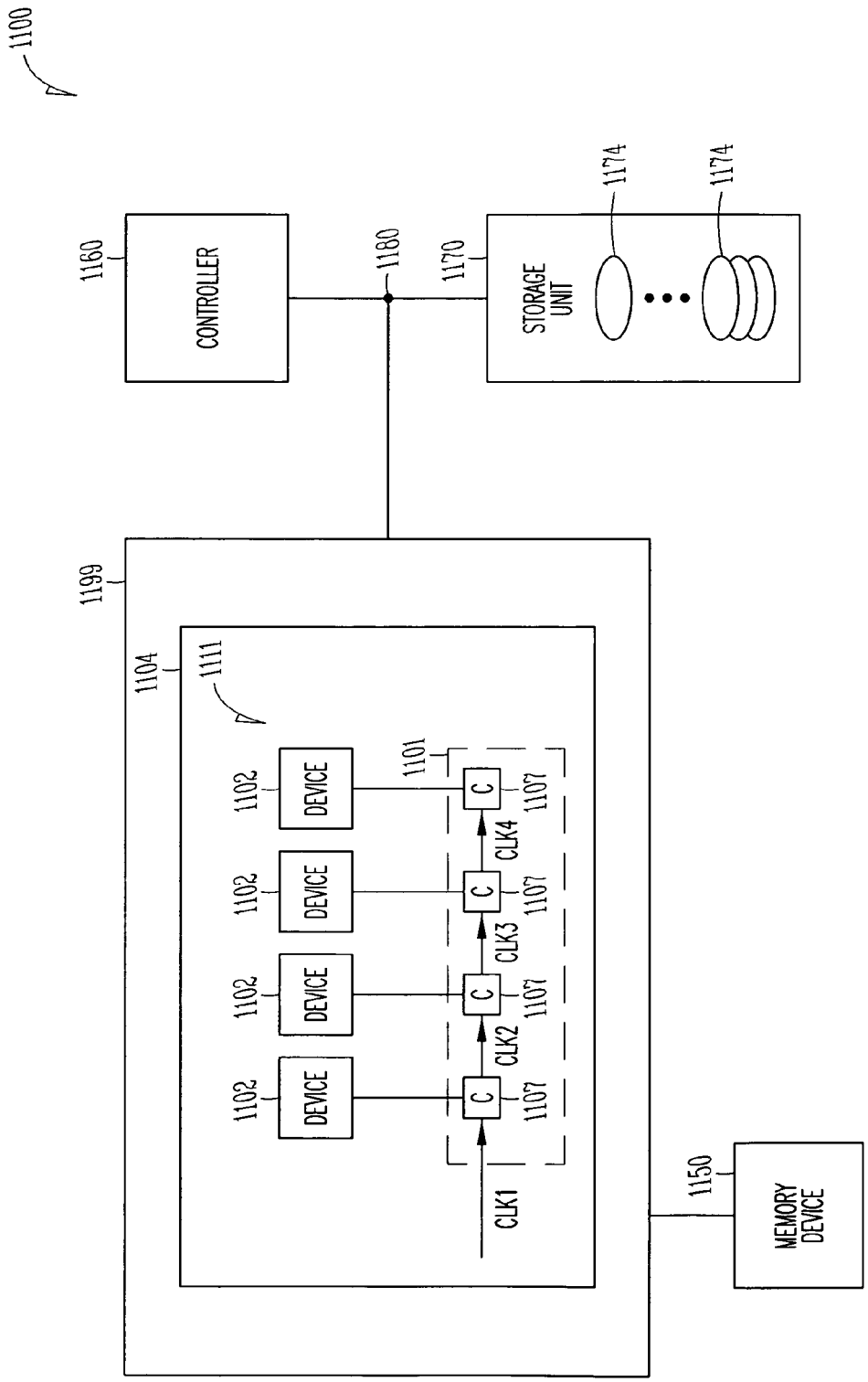
FIG. 11 shows a networking system having a redundant array of storage disks according to an embodiment of the invention.

FIG. 11 shows a networking system having a redundant array of storage disks according to an embodiment of the invention. Networking system 1100 includes an integrated circuit chip 1199, a memory device 1150, a controller 1160, and a storage unit 1170. In some embodiments, networking system 1100 forms at least a portion of a storage area network, in which controller 1160 includes a computer or a server.

Integrated circuit chip 1199 couples to controller 1160 and storage unit 1170 via an interconnection 1180 to exchange data with both controller 1160 and storage unit 1170.

In some embodiments, interconnection 1180 is a multi-drop interconnection.

In other embodiments, integrated circuit chip 1199 may be coupled to another circuit chip via a point-to-point interconnection in stead of via a multi-drop interconnection such as multi-drop interconnection 1180 of FIG. 11.

Memory device 1150 includes a medium to store data. In some embodiments, memory device 1150 includes a dynamic random access memory. In other embodiments, memory device 1150 includes a flash memory. In some other embodiments, memory device 1150 includes a combination of both dynamic random access memory and flash memory.

Storage unit 1170 includes a number of disks 1174 to store data used in networking system 1100 including integrated circuit chip 1199.

In some embodiments, disks 1174 are configured as a redundant array of independent disks (RAID) to store data used in networking system 1100 including integrated circuit chip 1199.

In other embodiments, disks 1174 are configured as a so-called "just a bunch of disks" (or JBOD) configuration to store data used in networking system 1100 including integrated circuit chip 1199.

In some other embodiments, storage unit 1174 includes only a single disk instead of multiple disks 1174.

Integrated circuit chip 1199 includes a circuit die 1104, and a system 1111 formed on circuit die 1104. In some embodiments, circuit die 1104 includes semiconductor material such as silicon. System 1111 includes at least one system described in FIG. 1 through FIG. 10. Thus, in some embodiments, system 1111 includes an interconnect structure having circuit structures, functions, and a clock distribution technique at least similar to the interconnect structures described in FIG. 1 through FIG. 10. For example, in FIG. 11, system 1 111 includes an interconnect structure 1101 having connector circuit (C) 1107 to transfer data among devices 1102 based on different input clock signals CLK1, CLK2, CLK3, and CLK4, which are generated in a distribution technique at least similar to the distribution techniques described in FIG. 1 through FIG. 10.

Figure 12:
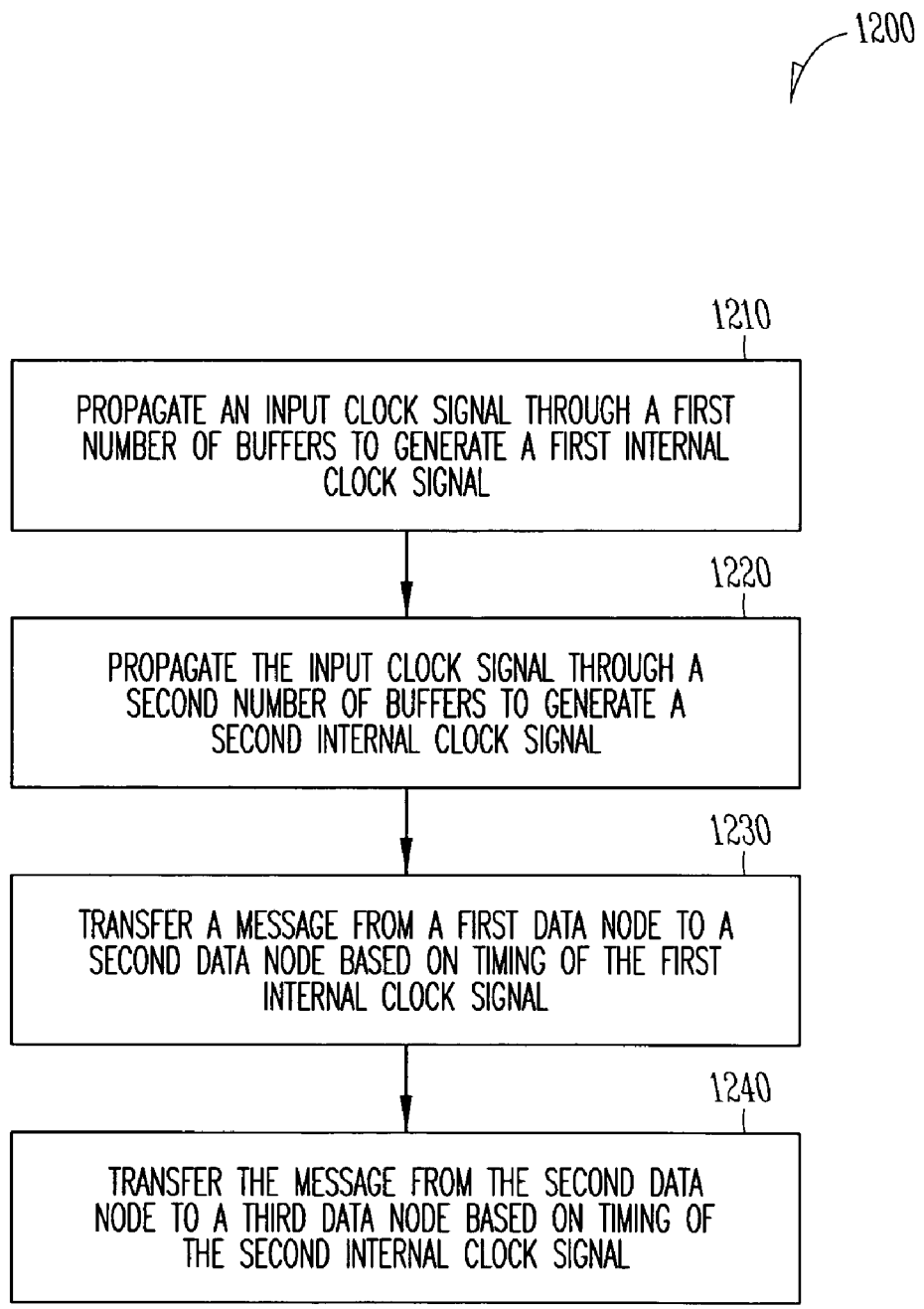
FIG. 12 shows a method of transferring signals according to an embodiment of the invention.

FIG. 12 shows a method of transferring signals according to an embodiment of the invention. In some embodiments, method 1200 is used in the systems and circuits described in FIG. 1 through FIG. 11. In FIG. 12, method 1200 transfers signals among a number of devices via an interconnect structure in a system. The interconnect structure in method 1200 includes a number of series-connected connector circuits forming pipelined interconnection to transfer signals. The signals represent both data and clock signals. Each connector circuit uses a different input clock signal to transfer data. In some embodiments, the connector circuits in method 1200 include embodiments of the connector circuits described in FIG. 1 through FIG. 10; and the input clock signal used by each connector circuit of the connector circuits is generated by propagating a clock signal serially through the connector circuits based on a distribution technique at least similar to the distribution techniques described in FIG. 1 through FIG. 11.

In method 1200, box 1210 propagates an input clock signal through a first number of buffers to generate a first internal clock signal. The first number of buffers is located in a first connector circuit of the plurality of connector circuits of the interconnect structure. The input clock signal and the first internal clock signal are not synchronized such that a phase difference exists between input clock signal and the first internal clock signal.

Box 1220 propagates the input clock signal through a second number of buffers to generate a second internal clock signal. At least a portion of the second number of buffers is located in a second connector circuit connected in series with the first connector circuit described box 1210. In some embodiments, the first plurality of buffers and the second plurality of buffer share a quantity of buffers. The input clock signal and the second internal clock signal are not synchronized such that a phase difference exists between input clock signal and the second internal clock signal. Further, the first number of buffers and the second number of buffers are unequal. Therefore, first and second internal clock signals are not synchronized.

Box 1230 transfers a message from a first data node to a second data node based on timing of the first internal clock signal. The message represents at least a portion of data such as data information, destination information, address information, and command information. In box 1230 the first connector circuit uses the first internal clock signal to transfer the message from the first data node to the second data node.

Box 1240 transfers the message from the second data node to a third data node based on timing of the second internal clock signal. In this box, the second connector circuit uses the second internal clock signal to transfer the message from the second data node to the third data node. The first, second, and third data nodes are located on a data transfer path of the interconnect structure such as data nodes 371, 372, and 373 on transfer path 391 or data nodes 381, 382, and 383 on transfer path 392 of FIG. 3. In method 1200, the message is subsequently transferred to a device coupled to the interconnect structure.

Method 1200 propagates the input clock signal serially through two connector circuits to generate two different internal clock signals, as an example. Embodiments exists where the interconnect structure used in method 1200 includes more than two series-connected connector circuits. In these embodiments, methods 1200 propagates the input clock signal serially through more than two connector circuits to generate more than two different internal clock signals.

The above description of the embodiments represented by FIG. 1 through FIG. 12 is intended to be illustrative, and not restrictive. Many other embodiments will be apparent to those of skill in the art upon reading and understanding the above description. Therefore, the scope of various embodiments is determined by the appended claims, along with the full range of equivalents to which such claims are entitled.

What is claimed is:

1. An interconnect structure comprising:
a first clock path including a plurality of buffers to propagate an input clock signal to provide a first internal clock signal at a first node of the first clock path and to provide a clock signal at a second node of the first clock path;
a second clock path including a plurality of buffers to propagate the clock signal from the second node of the first clock path to provide a second internal clock signal;
a first data transfer unit responsive to the first internal clock signal to transfer a message between a first data node and a second data node; and
a second data transfer unit responsive to the second internal clock signal to transfer the message between the second data node and a third data node.

2. The interconnect structure of claim 1, wherein the plurality of buffers the first clock path includes a first buffer and a second buffer coupled to the first buffer, the first buffer including an output node coupled to the first node to provide the first internal clock signal, and the second buffer including an output node coupled to the second node to provide the clock signal.

3. The interconnect structure of claim 2, wherein a quantity of buffers in the first clock path is unequal to the quantity of the buffers in the second clock path.

4. The interconnect structure of claim 2, wherein one of the first and second buffers of the first clock path is coupled in series with at least one of the buffers of the second clock path.

5. The interconnect structure of claim 1, wherein the first data transfer unit includes a receiver responsive to the first internal clock signal to receive the message from the first data node, and a transmitter responsive to the first internal clock signal to receive the message from the receiver to transfer the message to the second data node, and wherein the second data transfer unit includes a receiver responsive to the second internal clock signal to receive the message from the second data node, and a transmitter responsive to the second internal clock signal to receive the message from the receiver of the second data transfer unit to transfer the message to the third data node.

6. The interconnect structure of claim 5, wherein each of the receiver and the transmitter of the first data transfer unit includes a latch responsive to the first internal clock signal to transfer the message between the first data node and the second data node, wherein each of the receiver and the transmitter of the second data transfer unit includes a latch responsive to the second internal clock signal to transfer the message between the second data node and the third data node.

7. The interconnect structure of claim 6, wherein the first data transfer unit further includes a delay element coupled between the latch of the transmitter of the first data transfer unit and the latch of the receiver of the second data transfer unit.

8. The interconnect structure of claim 1 further comprising:
a third clock path including a plurality of buffers to propagate the input clock signal to provide a third internal clock signal; and
a third data transfer unit responsive to the third internal clock signal to transfer the message between the third data node and a fourth data node, wherein a quantity of the buffers in the third clock path is unequal to the quantity of the buffers in the second clock path.

9. An interconnect structure comprising:
a first connector circuit including a clock unit, the clock unit including a number of first buffers to propagate a first clock signal to generate a second clock signal, and a data transfer unit including a downstream data path to transfer a downstream message based on the first clock signal;
a second connector circuit including a clock unit, the clock unit including a number of second buffers coupled in series with the first buffers to propagate the second clock signal to generate a third clock signal, and a data transfer unit including a downstream data path to transfer the downstream message based on the second clock signal; and
a third connector circuit including a clock unit, the clock unit including a number of third buffers coupled in series with the second buffers to propagate the third clock signal, and a data transfer unit including a downstream data path to transfer the downstream message based on the third clock signal.

10. The interconnect structure of claim 9, wherein the number of first buffers, the number of second buffers, and the number of third buffers are equal.

11. The interconnect structure of claim 9, wherein the data transfer unit of each of the first, second, and third connector circuits further includes an upstream data path to transfer an upstream message.

12. The interconnect structure of claim 11, wherein the downstream data path of each of the first, second, and third connector circuits includes a receiver, a transmitter, and a control segment to pass the downstream message between the receiver and the transmitter, wherein the upstream data path of each of the first, second, and third connector circuits includes a receiver, a transmitter, and a control segment to pass the upstream message between the receiver and the transmitter of the upstream data path.

13. The interconnect structure of claim 12, wherein each of the receiver and the transmitter of the downstream data path of each of the first, second, and third connector circuits includes a flip flop to transfer the downstream message based on one of the first, second, and third clock signals, and wherein each of the receiver and the transmitter of the upstream data path of each of the first, second, and third connector circuits includes a flip flop to transfer the upstream message based on one of the first, second, and third clock signals.

14. The interconnect structure of claim 12, wherein each of the receiver and the transmitter of the upstream data path of the first connector circuit includes a flip flop to transfer the upstream message based on the first clock signal, wherein the receiver of the downstream data path of the first connector circuit includes a flip flop to transfer the downstream message based on the first clock signal, and wherein the transmitter of the downstream data path of the first connector circuit includes a flip flop to transfer the downstream message based on the second clock signal.

15. The interconnect structure of claim 12, wherein each of the receiver and the transmitter of the downstream data path of the first connector circuit includes a latch to transfer the downstream message based on the first clock signal, wherein the transmitter of the upstream data path of the first connector circuit includes a latch to transfer the upstream message based on the first clock signal, and wherein the receiver of the upstream data path of the first connector circuit includes a latch to transfer the upstream message based on the second clock signal.

16. The interconnect structure of claim 9 further comprising a connector interface circuit coupled to the first connector circuit and a device to transfer data between the first connector circuit and the device, wherein the connector interface circuit includes a clock unit to provide the device a clock signal having a frequency unequal to a frequency of the first clock signal to allow the device to transfer data at a transfer rate unequal to a transfer rate of data transferred in the first connector circuit.

17. The interconnect structure of claim 9, wherein a distance between the first and second connector circuits is less than two millimeters, and wherein a distance between the second and third connector circuits is less than two millimeters.

18. A system comprising:
an interconnection to transfer data with multiple disks; and
an integrated circuit chip coupled to the interconnection to transfer data with the multiple disks, the integrated circuit chip including:
a plurality of devices;
a clock generator to generate a master clock signal; and
an interconnect structure to transfer data among the devices, the interconnect structure including a plurality of connector circuits, each of the connector circuits including a data transfer unit to transfer data, a clock unit to provide timing for a transfer of the data in the data transfer unit based on an input clock signal among a plurality of input clock signals, wherein a combination of the clock unit from each of the connector circuits forms a clock propagation path to serially propagate the master clock signal through the clock propagation path to provide the plurality of input clock signals.

19. The system of claim 18, wherein the clock unit of each of the connector circuits includes at least one buffer located on the clock propagation path.

20. The system of claim 18, wherein the clock unit of a first connector circuit of the plurality of connector circuits includes a clock path having a first number of buffers to propagate the master clock signal to generate a first input clock signal of the plurality of input clock signals, wherein the clock unit of a second connector circuit of the plurality of connector circuits includes a clock path having a second number of buffers coupled in series with the first number of buffers to propagate the first input clock signal to generate a second input clock signal of the plurality of input clock signals, wherein the first number of buffers is equal to the second number of buffers.

21. The system of claim 18, wherein the connector circuits are arranged in a ring formation.

22. The system of claim 18 further comprising:
a plurality of additional connector circuits coupled to a plurality of additional devices, each of the additional connector circuits including a data transfer unit to transfer data, a clock unit to provide timing for a transfer of the data in the data transfer unit based on an additional input clock signal among a plurality of additional input clock signals; and
a crossbar to allow the plurality of devices to transfer data with the plurality of additional devices via the crossbar, wherein a combination of the clock unit from each of the additional connector circuits forms an additional clock propagation path, wherein the crossbar is configured to serially propagate the master clock signal from the clock generator through the additional clock propagation path to provide the plurality of additional input clock signals.

23. The system of claim 18, wherein the multiple disks are configured as a redundant array of independent disks.

24. A method comprising:
propagating an input clock signal through a first number of buffers to generate a first internal clock signal;
propagating the input clock signal through a second number of buffers to generate a second internal clock signal, wherein the second number of buffers is unequal to the first number of buffers;
transferring a message from a first data node to a second data node based on timing of the first internal clock signal; and
transferring the message from the second data node to a third data node based on timing of the second internal clock signal.

25. The method of claim 24, wherein at least one buffer of the first number of buffers is coupled in series with at least one buffer of the second number buffers.

26. The method of claim 24 further comprising:
propagating the input clock signal through a third number of buffers to generate a third internal clock signal, wherein the third number of buffers is unequal to the second number of buffers; and
transferring the message between the third second data node and a fourth data node based on timing of the third internal clock signal.

27. The method of claim 26, wherein the first internal clock signal, the second internal clock signal, and the third internal clock signal are asynchronous.

28. The method of claim 26, wherein transferring the message between the first data node and the second data node includes transferring the message to a first connector circuit coupled between the first and second data nodes, wherein transferring the message between the second data node and the third data node includes transferring the message to a second connector circuit coupled between the second data node and the third data node, wherein transferring the message between the third data node and the fourth data node includes transferring the message to a third connector circuit coupled between the third and fourth data nodes, and wherein the method further comprises transferring the message to a device coupled to one of the first, second, and third connector circuits.

* * * * *

UNITED STATES PATENT AND TRADEMARK OFFICE
CERTIFICATE OF CORRECTION

PATENT NO. : 7,426,632 B2  
APPLICATION NO. : 11/095289  
DATED : September 16, 2008  
INVENTOR(S) : Denham It is certified that error appears in the above-identified patent and that said Letters Patent is hereby corrected as shown below:

On the face page, in field (74), in "Attorney, Agent, or Firm", in column 2, line 1, delete "Lunbderg" and insert -- Lundberg --, therefor.

In column 14, line 56, in Claim 2, after "buffers" insert -- of --. (First occurrence)

In column 18, line 13, in Claim 25, delete "number" and insert -- number of --, therefor.

In column 18, line 19, in Claim 26, after "third" delete "second".

Signed and Sealed this

Twenty-fifth Day of November, 2008

JON W. DUDAS  
*Director of the United States Patent and Trademark Office*